July 20, 1937.　　　H. L. BLUM　　　2,087,567
DOUBLE ACTION FLUID METER
Filed Nov. 3, 1934　　　2 Sheets-Sheet 2
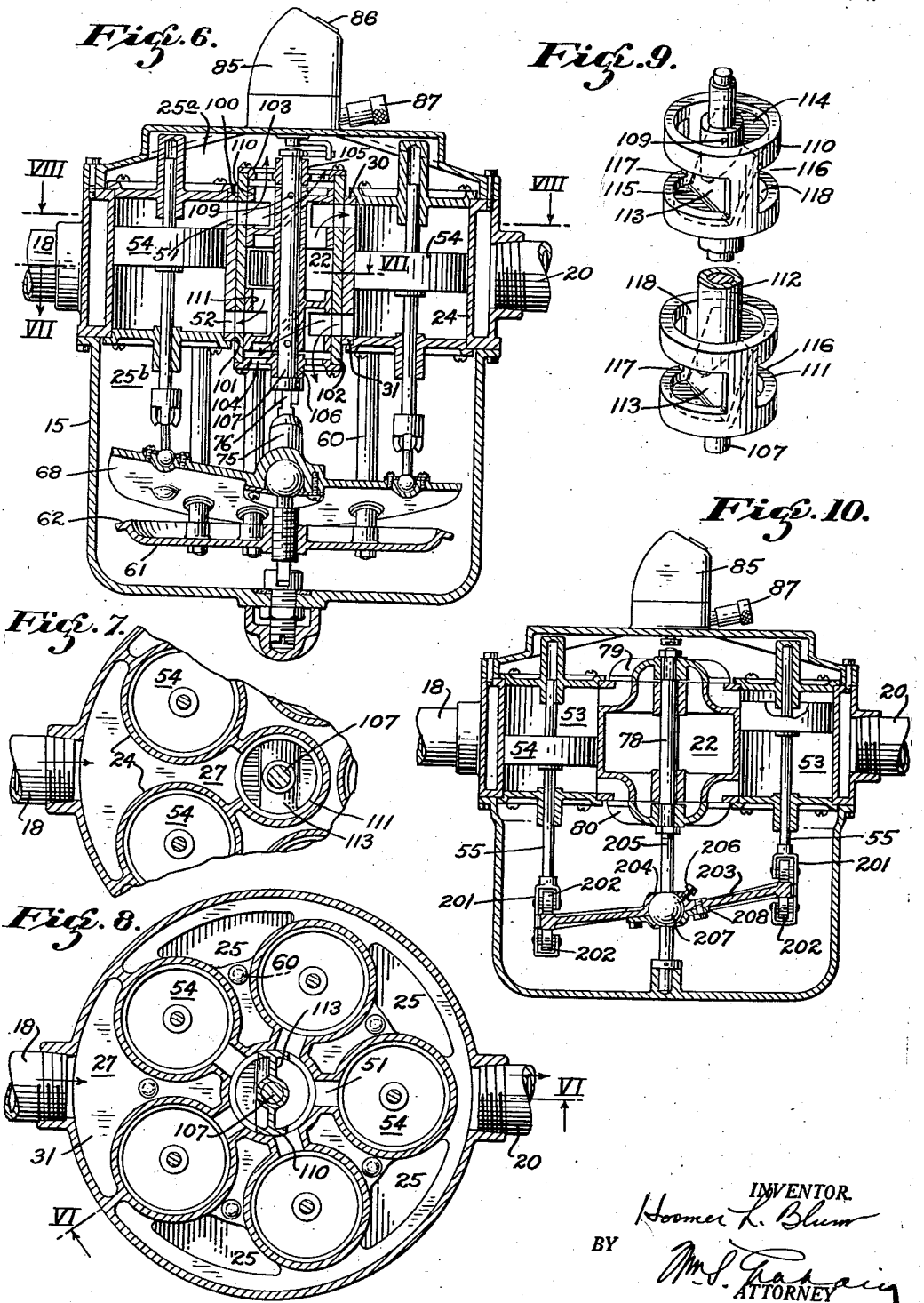

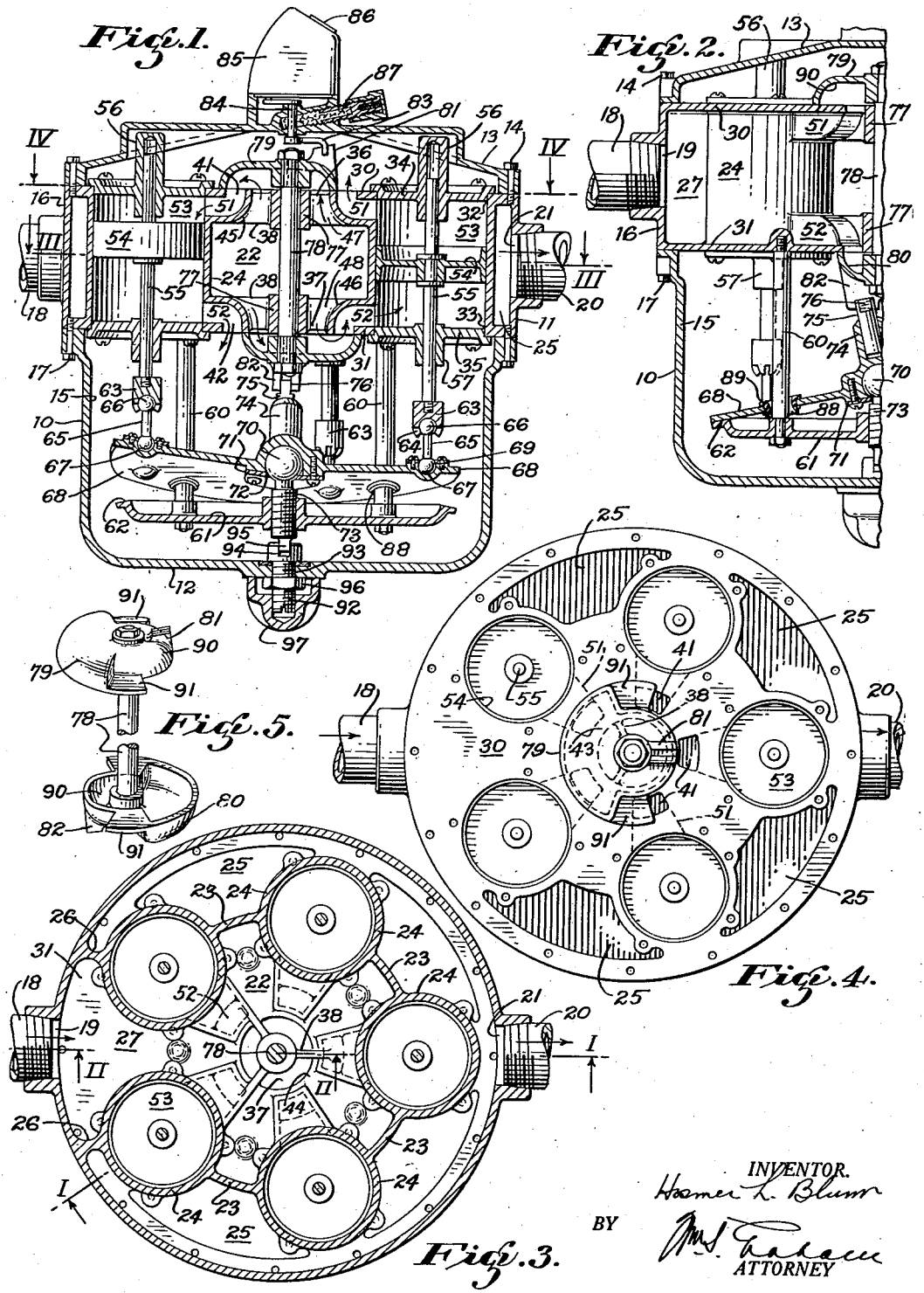

Patented July 20, 1937

2,087,567

UNITED STATES PATENT OFFICE 2,087,567

DOUBLE ACTION FLUID METER

Hosmer L. Blum, Burlingame, Calif.

Application November 3, 1934, Serial No. 751,384

26 Claims. (Cl. 73—244)

This invention relates to double action fluid meter and more particularly to double action fluid meters in which cylinders, pistons and valves are employed and fluid measured in the cylinders on opposite sides of the piston, and wherein the measuring capacity of the meter is greatly increased.

Among the objects of the invention are to provide a fluid meter utilizing both forward and reverse stroke of piston for measuring purposes; to provide a cylinder type meter utilizing areas in the cylinders above and below a piston for measuring purposes; to provide a fluid meter having plural valves for separately passing fluid in transit from measuring chambers on opposite sides of a piston; to provide a meter of exceptionally accurate and increased measuring capacity; to provide a meter readily assembled or disassembled, simple in its parts, and efficient in operation; and to improve generally upon meters of the type employing headflow in actuation of measuring mechanism.

With the foregoing and other objects in view, all of which will be more apparent as this description proceeds, the invention consists in the novel construction and combination of parts hereinafter described, illustrated in the accompanying drawings, and pointed out in the claims hereto appended, it being understood that various changes in the form, proportion, size and details of construction of the apparatus may be resorted to within the scope of the appended claims, without departing from the spirit or sacrificing any of the advantages of the invention.

One form of the invention is exemplified in the accompanying drawings to which reference is made as a part of this specification and in which:—

Fig. 1 is a vertical sectional view taken on line I—I of Fig. 3.

Fig. 2 is a vertical sectional fragmentary view taken on line II—II of Fig. 3.

Fig. 3 is a horizontal transverse section taken on line III—III of Fig. 1.

Fig. 4 is a horizontal plan view taken on line IV—IV of Fig. 1 with top of meter and upper ends of cylinders removed.

Fig. 5 is an enlarged perspective of detail of valve mechanism.

Fig. 6 is a vertical section on line VI—VI of Fig. 8 showing a modification of valve mechanism.

Fig. 7 is a fragmentary portion of a plan view partly in section on line VII—VII of Fig. 6.

Fig. 8 is a horizontal transverse section on line VIII—VIII of Fig. 6.

Fig. 9 is a perspective of enlarged detail of structure of the modification of the valve of Fig. 6.

Fig. 10 is a fragmentary vertical section showing a modification of the structure of Fig. 1 in the mechanism for rotating a counting device and the valves, taken on a line corresponding to line VI—VI of Fig. 8.

Referring to the drawings, in which like characters of reference indicate corresponding parts, and particularly to Figs. 1 to 5 inclusive, 10 indicates generally a casing having a generally circular side wall 11, a bottom 12 and a removable top 13 suitably mounted to the side walls as by bolts 14. The side wall 11 is preferably constructed in sections, the lower section 15 combining with the bottom 12 to form a bowl and the upper section 16 being removably mounted upon the bowl section 15 as by bolts 17. An inlet conduit 18 has communication with the interior of the upper portion of the casing as at 19, and an outlet opening 20 also has communication with the interior of the casing in its upper portion as at 21. Within the casing, and preferably within the upper section thereof, is a centrally disposed chamber 22 which communicates directly with the inlet conduit 18. The centrally disposed chamber 22 is spaced from the interior walls of the casing, and said central chamber is defined by its enclosing wall 23 and the walls 24 of a plurality of piston chambers, generally referred to herein as cylinders, which are arranged concentrically about a common axis. This arrangement provides a space generally indicated 25 interior of the casing 10 and exterior of the central chamber 22 and the cylinder walls 24. This space 25 communicates directly with the outlet conduit 20 through the opening 21, but said space 25 is segregated or divided from direct communication with the inlet conduit 18 by walls 26 which separate the space 27 within the casing from the space 25. In this manner the inlet conduit 18 and the outlet conduit 20 are separated from direct communication, except through cylinders and valves which will be hereafter described. Horizontally disposed transversely within the casing are a pair of partition walls 30 and 31 which, respectively, overlie and underlie the plurality of concentrically disposed cylinders 24 and also the central chamber 22, and also the inlet space 27 within the casing, that portion of the upper plate 30 and lower plate 31 which directly overlie and underlie, respectively the interior of the chamber of the respective cylinders being provided with respective openings 32, 33, which in turn are closed by separate cylinder end cover plates 34, 35. It will be noted that the cover plates 30, 31 do not extend over and cover the space 25 within the casing. The upper partition 30 and the lower partition 31 each have a centrally disposed opening 36, 37, suitably webbed across for support purposes as at 38. Radially outwardly from the openings 36, 37, each partition wall 30, 31 is provided with a plurality of openings 41, 42 in spaced relation to each other and concentric about the axis of openings 36, 37 and separated therefrom by a ring track member 43, 44. It will be noted, (see Fig. 1), that the central chamber 22 is formed radially inwardly as at 45, 46 at its upper and lower end portion and that at each of said end portions the inner chamber 22 is provided with conduits 47, 48 which communicate with the respective openings 36, 37 of the upper and lower partition walls. It will be further noted that the inwardly formed portions 45 and 46 of the wall of the central chamber 22 provide a conduit and port 51 at the top of each cylinder chamber and a similar conduit and port 52 at the bottom of each cylinder chamber, said conduit and port communicating with the respective openings 41, 42 in the upper and lower partition walls 30, 31.

Within each cylinder, the interior of which is designated 53, there is a reciprocating piston 54 mounted upon an oscillating shaft 55 which is slidably mounted for reciprocation in bearing 56 in the said plates 34 and 57 in the bottom closure plate 35. The pistons 54 are fixedly connected to the shaft 55 to reciprocate therewith as a unit, and the pistons 54, in their movement, are in staggered relation relative to each other in the respective cylinders, that is, the pistons do not all operate downwardly simultaneously, nor upward, simultaneously, but operate successively downwardly and upwardly.

Within the lower or bowl portion of the casing, and preferably suspended downwardly from the lower partition wall 31 as by a plurality of guide rods, 60, is a disc plate 61 having a circumferential track 62 at its peripheral edge.

The shaft 55 terminates at its lower end in a universal socket 63 which has resilient fingers 64 and in which is mounted for universal movement a link 65 having a ball 66 at each end. The ball at the opposite end of the link 65 is seated for universal movement in a pocket 67 of a wobble plate generally indicated 68, the ball being maintained therein by a plate 69. The wobble plate 68 is mounted upon a universal ball joint 70, being maintained with relation thereto by a plate 71 having an opening 72 centrally thereof.

The wobble plate 68 is vertically guided in its wobbling motion by the shafts 60 which extend through openings 88 suitably spaced to accommodate said shaft, and the openings 88 may be made sufficiently large to allow for a change of radius due to the vertical rocking of the wobble plate, and the openings 88 may have separate eyelets 89 therein provided with arcuate inner faces as shown in the cross section of Fig. 2 to prevent binding between shafts 60 and the wobble plate in the vertical swing of the plate. The ball joint 70 is supported by a pin 73 which is threadedly mounted for adjustability centrally of the disc plate 61. Extending upwardly centrally of the wobble plate 68 is a socket member 74 which has rotatably mounted therein a pin 75 preferably with a flat head 76.

The horizontal partition walls 30, 31, the cylinder walls 24, and the walls of the central chamber 22 are thick, and axially fit within the central chamber and extending therethrough is a tubular bearing 77 within which there is rotatably mounted a shaft 78, said shaft 78 having fixedly mounted to each end thereof valves 79, 80 which are rotated by the shaft 78. Each of the valves 79, 80 have on their outer faces a bifurcated wing 81, 82 which in the lower valve 80 engages the flat head 76 of pin 75, and which in the upper valve 79 engages a radial arm 83 which is connected to a rotatable shaft 84 of a counting device 85 having a sight face 86. The counting device may be of any suitable type and the details of its structure do not constitute a part of this invention. Suitable lubricating means may be provided for the shaft 84 as at 87.

The valves 79, 80 are shaped eccentrically in plan and are internally cupped as at 90 and have a greater radius on one side of the axis of rotation than on the other opposite side. Each valve has flatly disposed radial plate or wing portions 91, the purpose of which is to complete the closing of ports 41, 42 while the portion of greater radius of the valve cup is rotating and only partially covers a port 41, 42.

Means are provided for adjusting the wobble plate 68 with relation to its track 62 and thereby correcting any maladjustment between the stroke of the piston and the counting device through the adjustment of the wobble plate. This adjustment may be made from the exterior of the casing 10, by means of an adjustment screw 92 which is threadedly mounted in the bottom wall 12 as at 93 and has a recess 94 in its head within the casing, into which recess may be keyed the bottom end of the pin 73 as at 95. A suitable lock nut 96 may be employed to definitely position the adjustment screw 93 and a suitable cap 97 may enclose the outer end of the adjustment screw.

In the modification disclosed in Fig. 6 the casing and inlet and outlet thereof, the cylinders 24, pistons therein and wobble plate assembly are substantially similar to the structure disclosed in the description of Figs. 1 and 2 except that the cylinder ports 51, 52 of Fig. 6 do not require the conduit formation which is shown in Fig. 1. The modification of Fig. 6 resides in the valve structure, in order to accommodate which a central opening is arranged in each of the horizontal partition walls 30, 31, said openings being designated 100 and 101, said openings being continued centrally of the concentrically disposed cylinders. Within these openings is fixedly mounted a cylindrical shell or sleeve 102 which by means of perforated web plates at top and bottom 103 and 104 supports central tubular bearings 105, 106 and within which is mounted for rotation therein a shaft 107, the lower end of the shaft being slotted to receive the flat head 76 of the pin 75 which is operated orbitally by the wobble plate 68. Keyed to shaft 107 as by pins 109 are a pair of valves 110 and 111 which are relatively spaced axially, providing therebetween a central chamber 22 which serves to receive incoming fluid the same as central chamber 22 in Fig. 1. The valve structures are shown in the enlarged detail in Fig. 9 and each unit thereof may be separate or they may be joined as an integral structure by a sleeve 112 since the two units of the valve rotate in unison on shaft 107. Each valve unit comprises a cylindrical body hollowed out in the nature of a shell which is provided with a partition wall 113 extending from an upper portion at one side of the valve to a lower portion at the opposite side of the valve, as indicated at 114 and 115 in Fig. 9. Each valve body is provided in its side wall with oppositely disposed valve ports 116 and 117, said ports being separated from communication therebetween by the partition wall 113. Each side of the valve has an additional opening, one of which communicates with the central chamber 22 as at 118 and the other opening communicating with the chamber 25ª and the chamber 25ᵇ respectively, at the upper and lower portions of the casing, said chambers 25ª and 25ᵇ being in communication with the chamber 25 which empties into the discharge outlet. The side wall openings 116 and 117 of the valve communicate, upon rotation of the valve, with the cylinder ports 51 and 52 and the partition wall 113 serves to guide fluid from chamber 22 into the respective cylinders, and, upon rotation of the valve, guides the fluid from the cylinder to respective chambers 25ª and 25ᵇ. Thus the valves of Figs. 6 and 9 serve the same function as the valves in Figs. 1 and 5.

In the modification of Fig. 10 the cylinder and valve structure and the casing and its chambers may be substantially similar to the structures of either Fig. 1 or Fig. 6, the modification in Fig. 10 residing in substituting a disc cam for the wobble plate 68 and the disc track plate 61. In this modification the connecting rod 55 mounts at its lower end a yoke 201 which has a pair of rotatable face rollers 202 which engage between their opposed faces the track of a disc cam 203, said cam disc being fixedly mounted as at 204 to the centrally rotatable shaft 205 upon which are fixedly mounted for rotating therewith the valve at the end of the central chamber 22 for intermittent communication with the cylinder ports 51, 52. The angle of inclination of the disc cam 203 relative to the shaft 205 may be adjusted by a set screw 206 which engages a ball joint 207 fixedly mounted upon the shaft 205 and upon which the disc cam 203 is mounted by clamp plate 208. The disc 203 is substantially flat but may be slightly deformed from an exact plane, as shown in Fig. 10, so as to provide faces at its outer track which will present a flat face to correspond with flat faces of rollers 202.

The operation of the apparatus is as follows:—

The fluid to be measured flows under normal head pressure into the inlet conduit 18 through the inlet chamber 27 and into the central chamber 22 and thence through the valve ports which communicate with the central chamber and into the cylinder chamber, the valves being so arranged that the fluid is admitted through the cylinder port above the piston in one cylinder and simultaneously below the piston in a substantially opposite cylinder. Simultaneously with the inflow of the fluid into the cylinder the valve ports which communicate with the respective chambers 25ª and 25ᵇ then register with the cylinder ports which are on the opposite side of the piston in the cylinder into which the fluid is flowing, and thus, at the same time that the fluid is flowing into a cylinder on one side of the piston, fluid is also flowing out of that same cylinder on the other side of the piston which permits the pistons to reciprocate in the cylinders responsive to the head flow of the fluid. The reciprocation of the pistons and the shaft or rods upon which they are respectively mounted, in turn actuates the wobble plate 68 in the exemplifications shown in Figs. 1 and 6 and this in turn rotates the shaft upon which the valves are mounted and also actuates the arm 83 of the counting mechanism.

In Fig. 10 the operation is identical with Fig. 1 except that the cam disc 203 is actually rotated responsive to the reciprocation of the piston and thereby rotates the central shaft 205 whereas in Figs. 1 and 6 the wobble plate rotates the central shaft through its wobbling movement which is transmitted to an orbital movement at the head 76 of the pin 75.

It will thus be noted that all fluid which passes through the cylinders is emptied into the respective chambers 25ª and 25ᵇ and thence into the chamber 25 which communicates with the outlet conduit 20, the fluid having served its purpose of registering its quantity upon the counting mechanism by the flow of the fluid through the cylinders prior to its flow into chamber 25 and thence to the outlet conduit. It will thus be noted that the same cylinder measures fluid on both sides of the piston thus substantially doubling the measuring capacity of a meter of this type with substantially no extensive increase of parts.

It will also be noted that all of the mechanical structure of the meter is mounted upon or depending from the two horizontal partition walls 30, 31 which permit the entire mechanism of the meter to be removed from its bowl or lower section of the chamber 15 for sterilization, cleaning or repair, and that the parts, during such removal remain in the same relative position so that no readjustment of parts is necessary when the meter is reassembled into its operating form. It will be noted that the valves rotate in unison on an axis parallel to the axes of the cylinders; that the axis of nutation of the wobble plate, and also the axis of rotation of the cam disc is the same axis on which the valves rotate, and that the pistons reciprocate upon longitudinal axes of the cylinders parallel to the axes of rotation of the valves, thus providing an extremely well balanced and smoothly operating structure which eliminates vibration and secures uniform and accurate metering of the fluid.

Having thus described my invention, what I claim and desire to secure by Letters Patent is:—

1. An apparatus of the character described including a casing having therein a fluid inlet opening, a fluid discharge opening, a plurality of cylinders, arranged about and spaced from a common axis providing a chamber centrally thereof which has free communication with one of said openings, a piston reciprocably mounted in each cylinder, each of said cylinders having a valve controlled port on opposite axial sides of the piston, each port being adapted for both receiving and discharging fluid from its cylinder, valve means at each end of said central chamber adapted for simultaneously opening the respective ports in the same cylinder to communication with the respective fluid inlet opening and fluid discharge opening, and means including a disc plate operable responsive to reciprocation of the pistons within the respective cylinders successively for correlating the reciprocal movement of the pistons whereby said valve means may be actuated.

2. Apparatus of the character described including a casing having therein a fluid inlet opening, a fluid discharge opening, a plurality of cylinders arranged about and spaced from a common axis providing a chamber centrally thereof which has free communication with one of said openings, a piston reciprocably mounted in each cylinder, each of said cylinders having a valve controlled port on opposite axial sides of the piston, each port being adapted for both receiving and discharging fluid from its cylinder, rotatable valve means at each end of said central chamber operatively adjacent each of said cylinder ports adapted for alternately opening and closing the adjacent cylinder ports to communication with the respective fluid inlet and discharge openings, each of said valve means having a passageway therethrough in continuous communication with the central chamber, and means including a disc plate operable responsive to reciprocation of the pistons in the respective cylinders successively for translating the reciprocal movement to rotary motion, and means rotatable by the last mentioned means for rotating said valve means.

3. An apparatus of the character described including a casing having therein a fluid inlet opening, a fluid discharge opening, a plurality of cylinders arranged about and spaced from a common axis providing a chamber centrally thereof which has free communication with one of said openings, a piston reciprocably mounted in each cylinder, each of said cylinders having a valve controlled port on opposite axial sides of the piston, each port being adapted for both receiving and discharging fluid from its cylinder, a separate rotatable valve means at opposite end portions of the cylinders operatively adjacent each of said cylinder ports being mounted for unison rotation and adapted for alternately opening and closing the adjacent cylinder ports to communication with the respective fluid inlet and fluid discharge openings, each of said valve means having a passageway therethrough in continuous communication with the central chamber, and means including a disc plate operable responsive to the reciprocation of the pistons in the respective cylinders successively for translating the reciprocal movement to rotary motion, and means rotatable by the last mentioned means for rotating said valve means.

4. An apparatus of the character described including a casing having a fluid receiving inlet opening and a fluid discharge opening, a plurality of cylinders fixedly arranged about a common axis, a piston reciprocably mounted in each cylinder, each of said cylinders being closed at opposite ends and provided at each of said end portions with a valve controlled port on opposite axial sides of the piston, each port being adapted for both receiving and discharging fluid from its cylinder, a pair of rotatable valves respectively disposed at opposite end portions of the cylinders and mounted for rotation in unison and respectively adapted for simultaneously opening the respective ports in the same cylinder to communication with the respective fluid inlet and fluid discharge openings, and means including a disc plate exterior of one end of the cylinders operable responsive to reciprocal movement of the pistons in the respective cylinders successively for translating the reciprocal movement to rotary motion, said last mentioned means having operable connection to the valves for rotating them.

5. An apparatus of the character described, including a casing having a fluid inlet opening and a fluid discharge opening, a plurality of cylinders arranged about a common axis providing a fluid receiving chamber centrally of the cylinders, said chamber having free communication with one of said openings, a piston reciprocably mounted in each cylinder, each of said cylinders being closed at opposite ends and provided at each of said end portions with a valve controlled port on opposite axial sides of the piston, each port being adapted for both receiving and discharging fluid from its cylinder, a separate rotatable valve at relatively opposite end portions of the cylinders and operatively adjacent each of said cylinder ports, said valves being mounted for rotation in unison and adapted for alternately opening and closing the adjacent cylinder ports to communication with the respective fluid inlet and fluid discharge openings, and means including a disc plate operable responsive to reciprocal movement of the pistons in the respective cylinders successively for translating the reciprocal movement to rotary motion, said last mentioned means having operable connection to the valves for rotating them.

6. An apparatus of the character described including a casing having a fluid inlet opening and a fluid discharge opening, a plurality of cylinders concentrically arranged about and spaced from a common axis providing a central chamber for receiving fluid, said chamber having free communication with one of said openings, a piston reciprocably mounted in each cylinder, each of said cylinders being closed at opposite ends and provided at each of said end portions with a valve controlled port on opposite axial sides of the piston, each port being adapted for both receiving and discharging fluid from its cylinder, rotatable valve means at opposite end portions of the cylinders, said valve means being mounted for rotation in unison and adapted for simultaneously opening the respective ports in the same cylinder to communication with the respective fluid inlet and fluid discharge openings, said valve means having a passageway therethrough continuously in communication with said central chamber, and means including a disc plate operable responsive to reciprocation of the pistons within the respective cylinders successively for translating the reciprocal movement to rotary motion and means rotatable by the last mentioned means for rotating said valve means.

7. An apparatus of the character described including a casing having a fluid inlet opening and a fluid discharge opening, a plurality of cylinders concentrically arranged about and spaced from a common axis providing a central chamber for receiving fluid, said chamber having free communication with one of said openings, a piston reciprocably mounted in each cylinder, each of said cylinders having a port on opposite axial sides of the piston, a rotatable valve at each end of said central chamber adapted for simultaneously opening the respective ports of the same cylinder to communication with the respective fluid inlet and fluid discharge openings, said valves each having a passageway therethrough continuously in communication with said central chamber, and means including a disc plate operable responsive to reciprocation of the pistons in the respective cylinders successively for translating the reciprocal movement to rotary motion, and means rotatable by the last mentioned means for rotating said valves.

8. Apparatus of the character described including a casing having a fluid inlet opening and a fluid discharge opening, a plurality of cylinders spaced from both ends of said casing providing an upper and a lower chamber which respectively communicate with one of said openings, said cylinders being arranged about and spaced from a common axis providing a central chamber for receiving fluid, said chamber having free communication with the other of said openings, a piston reciprocably mounted in each cylinder, each of said cylinders having a port on opposite axial sides of the piston, each port being adapted for both receiving and discharging fluid from its cylinder, a rotatable valve at each end of said central chamber and adjacent each of said cylinder ports for alternately opening and closing the adjacent cylinder ports to communication with the respective fluid inlet and discharge openings, said valves each having a passageway therethrough continuously in communication with said central chamber, and means in said lower chamber and operable responsive to reciprocation of the pistons in the respective cylinders successively for translating the reciprocal movement to rotary motion, and means rotatable by the last mentioned means for rotating said valves.

9. An apparatus of the character described including a casing having a fluid inlet opening and a fluid discharge opening, a plurality of cylinders arranged about and spaced from a common axis providing a central chamber for receiving fluid, said chamber having free communication with one of said openings, said cylinders having a guide at each end for a rod, a rod reciprocably mounted in each cylinder and having bearing in said guides, a piston in each cylinder fixedly mounted on the rod for reciprocation therewith as a unit, each of said cylinders having a port on opposite axial sides of the piston, a rotatable valve at each end of said central chamber operatively adjacent each of said cylinder ports adapted for alternately opening and closing the adjacent cylinder ports to communication with the respective fluid inlet and fluid discharge openings, said valves each having a passageway therethrough in free communication with said central chamber, means including a disc plate connected to and operable responsive to the reciprocation of the rod and piston unit in the respective cylinders successively for translating the reciprocal movement to rotary motion, and means rotatable by the last mentioned means for rotating said valves.

10. An apparatus of the character described including a casing having a fluid inlet opening and a fluid discharge opening, a plurality of cylinders arranged about a common axis, and spaced therefrom providing a central chamber therebetween, said chamber having free communication with one of said openings, a piston reciprocably mounted in each cylinder, each of said cylinders having a port on opposite axial sides of the piston, a rotatable valve at each end of said central chamber and having a passageway in communication therewith, said valves being adapted for simultaneously opening the respective ports in the same cylinder to communication with the respective fluid inlet and fluid discharge openings, and means including a disc plate operable responsive to reciprocal movement of the pistons in the respective cylinders successively for translating the reciprocal movement to rotary motion, said last mentioned means having operable connection to the valves for rotating them, each of said valves including a pair of communicating cup portions having an axis of rotation and a valve face at the edge of the cup portions, one of said cup portions having a greater radial dimension than the other, and wings extending radially outward from the valve face of the small cup portion.

11. An apparatus of the character described, including a casing having a fluid inlet opening and a fluid discharge opening, a plurality of cylinders arranged about a common axis, and spaced therefrom providing a central chamber therebetween, said chamber having side-wall communication with one of said openings and having ports at both its ends, a piston reciprocably mounted in each cylinder, each of said cylinders having a port on opposite axial sides of the piston, a rotatable valve at each end of said central chamber and operatively adjacent each of said cylinder ports adapted for alternately opening and closing the adjacent cylinder ports to communication with the respective fluid inlet and fluid discharge openings, and means operable responsive to reciprocal movement of the pistons in the respective cylinders successively for translating the reciprocal movement to rotary motion, said last mentioned means having operable connection to the valves for rotating them, said valves including a substantially hollow cylindrical body having an opening in opposite side-walls and an opening at each of its opposite ends and a transverse wall separating said cylindrical body into a pair of passageways, each of said passageways communicating with an end opening and a side wall opening, said side wall openings being adapted for communication with the cylinder ports, and one end opening being adapted for communication with the central chamber, and the opposite end opening being adapted for communication with the opening in the casing other than the opening with which the central chamber communicates.

12. In a fluid meter which includes a casing having an inlet opening and a discharge opening, and a plurality of cylinders arranged about and spaced from a common axis and having a plurality of axially spaced ports and a piston in each cylinder reciprocable between said ports, the combination of a valve unit and means including a disc plate correlating the reciprocation of the pistons in successive cylinders for translating reciprocal movement of the pistons to rotary motion, said valve unit comprising a chamber centrally of the arranged cylinders, said central chamber having an opening at each of its axial ends and an opening in its wall, said latter opening having free communication with one of said openings in the casing, a pair of valves rotatably mounted respectively at opposite end portions of the central chamber, and each having a passageway therethrough continuously in communication with an end opening of the central chamber and intermittently in communication with successive cylinder ports, said valves having operable connection to said correlating means for rotation thereby in unison and being formed so that upon rotation thereof the ports of successive cylinders are opened intermittently to the other of the openings in the casing.

13. A device in accordance with claim 1 in which the valve means is rotatably mounted on an axis of rotation substantially parallel with the longitudinal axes of the cylinders.

14. An apparatus of the character described including a casing having therein a fluid inlet opening and a fluid discharge opening, a plurality of fixed cylinders in the casing, a piston reciprocably mounted in each cylinder, each of said cylinders having a valve controlled port on opposite axial sides of the piston, each of said ports being adapted for receiving and discharging fluid from its cylinder, valve means at the opposite end portions of the cylinders, said valve means having independent conduits therethrough for controlling the respective ports at opposite end portions of each cylinder and being adapted for simultaneously opening the respective opposite ports of the same cylinder to communication with the respective fluid inlet opening and fluid discharge opening, and means exterior of one end of the cylinders operable responsive to reciprocation of the pistons in the respective cylinders successively for correlating the reciprocal movement of the pistons for actuating said valve means.

15. A device in accordance with claim 14 in which the valve means is rotatable and in which the axis of rotation of the valve means is substantially parallel with the longitudinal axes of the cylinders.

16. A device in accordance with claim 2, in which the axis of rotation of the valve means is substantially parallel with the longitudinal axes of the cylinders.

17. A device in accordance with claim 3 in which the separate valve means are rotatable and in which the axes of rotation of the valve means are substantially parallel with the longitudinal axes of the cylinders.

18. A device in accordance with claim 4, and in which the axes of rotation of the valves are substantially parallel with the longitudinal axes of the cylinders.

19. A device in accordance with claim 5, in which the axes of rotation of the valves are substantially parallel with the longitudinal axes of the cylinders.

20. A device in accordance with claim 6 and in which the axis of rotation of the valve means is substantially parallel with the longitudinal axis of the cylinders.

21. A device in accordance with claim 7, and in which the axes of rotation of the valves are substantially parallel with the longitudinal axes of the cylinders.

22. A claim in accordance with claim 8, and in which the axes of rotation of the valves are substantially parallel with the longitudinal axes of the cylinders.

23. A device in accordance with claim 9, and in which the axes of rotation of the valves are substantially parallel with the longitudinal axes of the cylinders.

24. A device in accordance with claim 10, and in which the axes of rotation of the valves are substantially parallel with the longitudinal axes of the cylinders.

25. A device in accordance with claim 11, and in which the axes of rotation of the valves are substantially parallel with the longitudinal axes of the cylinders.

26. A device in accordance with claim 12, and in which the axes of rotation of the valves are substantially parallel with the longitudinal axes of the cylinders.

HOSMER L. BLUM.